US010564504B2

(12) United States Patent
Hegyi

(10) Patent No.: US 10,564,504 B2
(45) Date of Patent: Feb. 18, 2020

(54) LIQUID-CRYSTAL VARIABLE RETARDER USING LIQUID CRYSTAL CELLS OF DIFFERING THICKNESSES

(71) Applicant: Palo Alto Research Center Incorporated, Palo Alto, CA (US)

(72) Inventor: Alex Hegyi, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/827,204

(22) Filed: Nov. 30, 2017

(65) Prior Publication Data

US 2019/0162999 A1 May 30, 2019

(51) Int. Cl.
| | |
|---|---|
| *G02F 1/13* | (2006.01) |
| *G02F 1/139* | (2006.01) |
| *G02F 1/1335* | (2006.01) |
| *G01J 4/04* | (2006.01) |
| *G02B 5/30* | (2006.01) |
| *G01J 3/447* | (2006.01) |
| *G01J 3/28* | (2006.01) |
| *G01J 3/45* | (2006.01) |
| *G01J 3/453* | (2006.01) |
| *G02F 1/133* | (2006.01) |
| *G02B 27/28* | (2006.01) |

(52) U.S. Cl.
CPC .............. *G02F 1/1395* (2013.01); *G01J 3/28* (2013.01); *G01J 3/2823* (2013.01); *G01J 3/447* (2013.01); *G01J 3/45* (2013.01); *G01J 3/4531* (2013.01); *G01J 4/04* (2013.01); *G02B 5/3083* (2013.01); *G02F 1/1326* (2013.01); *G02F 1/13306* (2013.01); *G02F 1/13318* (2013.01); *G02F 1/133528* (2013.01); *G01J 2003/2866* (2013.01); *G02B 27/286* (2013.01); *G02F 2201/58* (2013.01); *G02F 2203/62* (2013.01)

(58) Field of Classification Search
CPC . G02F 1/1326; G02F 1/1395; G02F 1/133528
USPC .......................................... 349/18, 198, 199
See application file for complete search history.

(56) References Cited

U.S. PATENT DOCUMENTS

| | | | |
|---|---|---|---|
| 4,342,516 A | 8/1982 | Chamran et al. | |
| 4,461,543 A | * 7/1984 | McMahon | ................ G02F 1/31 349/196 |
| 4,812,657 A | 3/1989 | Minekane | |

(Continued)

OTHER PUBLICATIONS

U.S. Appl. No. 15/858,338, filed Dec. 29, 2017.

(Continued)

*Primary Examiner* — James A Dudek
(74) *Attorney, Agent, or Firm* — Mueting, Raasch & Gebhardt, P.A.

(57) ABSTRACT

A liquid-crystal variable retarder has first and second liquid-crystal cells with respective first and second thicknesses, the second thickness being less than the first thickness. A feedback sensor provides a feedback signal indicative of a retardance of the liquid-crystal variable retarder. A controller is coupled to the feedback sensor and the first and second liquid-crystal cells. The controller is operable to apply a first signal to the first liquid-crystal cell based on a target retardance trajectory and a feedforward control model. The controller applies a second signal to the second liquid-crystal cell based on the feedback signal and the target retardance trajectory.

20 Claims, 6 Drawing Sheets

(56) References Cited

U.S. PATENT DOCUMENTS

| | | | |
|---|---|---|---|
| 4,848,877 A | 7/1989 | Miller | |
| 4,905,169 A | 2/1990 | Buican et al. | |
| 5,126,869 A * | 6/1992 | Lipchak | G01S 7/4811 |
| | | | 349/117 |
| 5,247,378 A | 9/1993 | Miller | |
| 5,347,382 A | 9/1994 | Rumbaugh | |
| 5,592,314 A * | 1/1997 | Ogasawara | G02F 1/13473 |
| | | | 349/114 |
| 5,619,266 A | 4/1997 | Tornita et al. | |
| 5,642,214 A * | 6/1997 | Ishii | G02F 1/13473 |
| | | | 349/117 |
| 5,784,162 A | 7/1998 | Cabib et al. | |
| 5,856,842 A | 1/1999 | Tedesco | |
| 5,953,083 A | 9/1999 | Sharp | |
| 6,169,594 B1 | 1/2001 | Aye et al. | |
| 6,330,097 B1 * | 12/2001 | Chen | G02F 1/055 |
| | | | 359/239 |
| 6,421,131 B1 * | 7/2002 | Miller | G01J 3/447 |
| | | | 356/453 |
| 6,552,836 B2 * | 4/2003 | Miller | G01J 1/26 |
| | | | 348/742 |
| 6,576,886 B1 | 7/2003 | Yao | |
| 6,774,977 B1 | 8/2004 | Walton et al. | |
| 6,992,809 B1 * | 1/2006 | Wang | G01J 3/2823 |
| | | | 349/18 |
| 7,067,795 B1 * | 6/2006 | Yan | G02F 1/0123 |
| | | | 250/225 |
| 7,116,370 B1 * | 10/2006 | Huang | G02B 27/28 |
| | | | 348/335 |
| 7,167,230 B2 * | 1/2007 | Klaus | G02F 1/13306 |
| | | | 349/18 |
| 7,196,792 B2 * | 3/2007 | Drevillon | G01J 4/04 |
| | | | 356/367 |
| 7,339,665 B2 | 3/2008 | Imura | |
| 7,630,022 B1 * | 12/2009 | Baur | G02B 5/3083 |
| | | | 349/117 |
| 7,999,933 B2 | 8/2011 | Mcclure | |
| 8,422,119 B1 | 4/2013 | Keaton | |
| 9,631,973 B2 | 4/2017 | Dorschner | |
| 9,864,148 B1 * | 1/2018 | Ishikawa | G02F 1/3134 |
| 2002/0060760 A1 * | 5/2002 | Weiner | H04B 10/2569 |
| | | | 349/96 |
| 2002/0181066 A1 * | 12/2002 | Miller | G01J 1/26 |
| | | | 359/237 |
| 2004/0036876 A1 | 2/2004 | Davis et al. | |
| 2004/0165101 A1 | 8/2004 | Miyanari et al. | |
| 2005/0190329 A1 | 9/2005 | Okumura | |
| 2006/0141466 A1 * | 6/2006 | Pinet | G01N 21/23 |
| | | | 435/6.11 |
| 2006/0187974 A1 | 8/2006 | Dantus | |
| 2006/0279732 A1 | 12/2006 | Wang | |
| 2007/0003263 A1 | 1/2007 | Nomura | |
| 2007/0030551 A1 * | 2/2007 | Oka | G02B 27/281 |
| | | | 359/237 |
| 2007/0070260 A1 * | 3/2007 | Wang | G02B 27/288 |
| | | | 349/18 |
| 2007/0070354 A1 * | 3/2007 | Chao | G01J 3/2823 |
| | | | 356/453 |
| 2008/0158550 A1 | 7/2008 | Arieli et al. | |
| 2008/0212874 A1 | 9/2008 | Steib | |
| 2008/0266564 A1 | 10/2008 | Themelis | |
| 2008/0278593 A1 | 11/2008 | Cho et al. | |
| 2009/0168137 A1 * | 7/2009 | Wen | G02B 27/286 |
| | | | 359/249 |
| 2009/0284708 A1 * | 11/2009 | Abdulhalim | B82Y 20/00 |
| | | | 349/198 |
| 2010/0056928 A1 | 3/2010 | Zuzak | |
| 2010/0296039 A1 * | 11/2010 | Zhao | G01J 4/04 |
| | | | 349/129 |
| 2011/0012014 A1 | 1/2011 | Livne et al. | |
| 2011/0170098 A1 | 7/2011 | Normand | |
| 2011/0273558 A1 | 11/2011 | Subbiah et al. | |
| 2011/0279744 A1 * | 11/2011 | Voigt | G02B 5/208 |
| | | | 349/18 |
| 2011/0299089 A1 | 12/2011 | Wang et al. | |
| 2012/0013722 A1 | 1/2012 | Wong et al. | |
| 2012/0013922 A1 | 1/2012 | Wong et al. | |
| 2012/0188467 A1 * | 7/2012 | Escuti | G02B 27/286 |
| | | | 349/1 |
| 2012/0268745 A1 | 10/2012 | Kudenov | |
| 2012/0300143 A1 * | 11/2012 | Voigt | G02B 5/208 |
| | | | 349/18 |
| 2013/0010017 A1 | 1/2013 | Kobayashi et al. | |
| 2013/0027516 A1 | 1/2013 | Hart | |
| 2013/0107260 A1 | 5/2013 | Nozawa | |
| 2014/0098309 A1 | 4/2014 | Shi et al. | |
| 2014/0125990 A1 | 5/2014 | Hinderling et al. | |
| 2014/0257113 A1 | 9/2014 | Panasyuk et al. | |
| 2014/0354868 A1 * | 12/2014 | Desmarais | H04N 5/23293 |
| | | | 348/333.01 |
| 2014/0362331 A1 * | 12/2014 | Shi | G02F 1/13363 |
| | | | 349/117 |
| 2015/0022809 A1 | 1/2015 | Marchant et al. | |
| 2015/0168210 A1 | 6/2015 | Dorschner | |
| 2015/0206912 A1 * | 7/2015 | Kanamori | G02B 26/001 |
| | | | 250/208.1 |
| 2016/0123811 A1 * | 5/2016 | Hegyi | G01J 3/0256 |
| | | | 348/33 |
| 2016/0127660 A1 * | 5/2016 | Hegyi | H04N 5/332 |
| | | | 348/164 |
| 2016/0127661 A1 * | 5/2016 | Hegyi | H04N 5/332 |
| 2016/0259128 A1 * | 9/2016 | Wagener | G02B 6/29302 |
| 2017/0017104 A1 * | 1/2017 | Lin | G02F 1/13471 |
| 2017/0264834 A1 | 9/2017 | Hegyi et al. | |
| 2017/0264835 A1 | 9/2017 | Hegyi et al. | |
| 2017/0363472 A1 * | 12/2017 | Abdulhalim | G02B 27/286 |
| 2017/0366763 A1 * | 12/2017 | Lin | G02F 1/13318 |
| 2018/0088381 A1 * | 3/2018 | Lin | G02F 1/13471 |
| 2018/0095307 A1 * | 4/2018 | Herloski | G02F 1/137 |
| 2019/0121191 A1 * | 4/2019 | Hegyi | G02F 1/133382 |

OTHER PUBLICATIONS

U.S. Appl. No. 15/858,368, filed Dec. 29, 2017.
U.S. Appl. No. 15/858,354, filed Dec. 29, 2017.
U.S. Appl. No. 15/858,609, filed Dec. 29, 2017.
File History for U.S. Appl. No. 14/527,347 as retrieved from the U.S. Patent and Trademark Office PAIR System on Jun. 26, 2018, 420 pages.
File History for U.S. Appl. No. 14/527,378 as retrieved from the U.S. Patent and Trademark Office PAIR System on Jun. 26, 2018, 205 pages.
File History for U.S. Appl. No. 14/883,404 as retrieved from the U.S. Patent and Trademark Office PAIR System on Jun. 26, 2018, 294 pages.
Itoh et al., "Liquid-crystal imaging Fourier-spectrometer array", Optics Letters, 15:11, 652-652, Jun. 1, 1990.
Li et al., "GPU accelerated parallel FFT processing for Fourier transform hyperspectral imaging", Applied Optics, vol. 54, No. 13, pp. D91-D99, May 1, 2015.
Persons et al., "Automated registration of polarimetric imagery using Fourier transform techniques", Proceedings of SPIE, vol. 4819, 2002.
Porter et al., "Correction of Phase Errors in Fourier Spectroscopy", International Journal of Infrared and Millimeter Waves, vol. 4, No. 2, 273-298, 1983.
Smith et al., "Increased acceptance bandwidths in optical frequency conversion by use of multiple walk-off-compensating nonlinear crystals". J. Opt. Soc. Am. B/ vol. 15, No. 1, Jan. 1998.
Hegyi et al., "Hyperspectral imaging with a liquid crystal polarization interferometer", Optics Express, vol. 23, No. 22, Oct. 26, 2015, 13 pages.
Jullien et al., "High-resolution hyperspectral imaging with cascaded liquid crystal cells", Optica, vol. 4, No. 4, Apr. 2017, pp. 400-405.
File History for U.S. Appl. No. 14/527,347 as retrieved from the U.S. Patent and Trademark Office PAIR System on Apr. 3, 2019, 546 pages.

(56) References Cited

OTHER PUBLICATIONS

File History for U.S. Appl. No. 14/527,378 as retrieved from the U.S. Patent and Trademark Office PAIR System on Apr. 3, 2019 407 pages.
File History for U.S. Appl. No. 14/883,404 as retrieved from the U.S. Patent and Trademark Office PAIR System on Apr. 3, 2019, 298 pages.
File History for U.S. Appl. No. 15/605,625 as retrieved from the U.S. Patent and Trademark Office PAIR System on Apr. 3, 2019, 155 pages.
File History for U.S. Appl. No. 15/605,642 as retrieved from the U.S. Patent and Trademark Office PAIR System on Apr. 3, 2019, 183 pages.
File History for U.S. Appl. No. 14/527,347 as retrieved from the U.S. Patent and Trademark Office PAIR System on Nov. 29, 2018, 504 pages.
File History for U.S. Appl. No. 14/527,378 as retrieved from the U.S. Patent and Trademark Office PAIR System on Nov. 29, 2018, 354 pages.
File History for U.S. Appl. No. 14/883,404 as retrieved from the U.S. Patent and Trademark Office PAIR System on Nov. 29, 2018, 256 pages.
File History for U.S. Appl. No. 15/605,625 as retrieved from the U.S. Patent and Trademark Office PAIR System on Nov. 29, 2018, 116 pages.
File History for U.S. Appl. No. 15/605,642 as retrieved from the U.S. Patent and Trademark Office PAIR System on Nov. 29, 2018, 129 pages.
EP Search Report for EP App. No. 182093212.0 dated May 2, 2019.

* cited by examiner

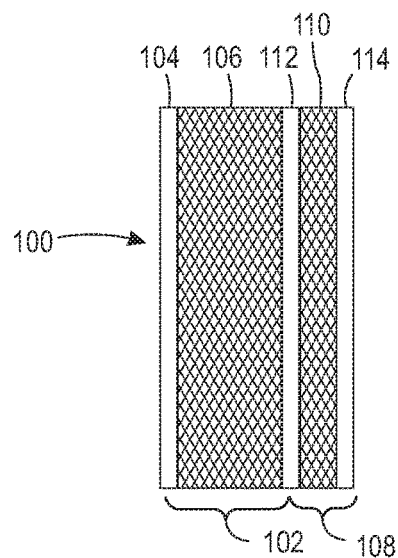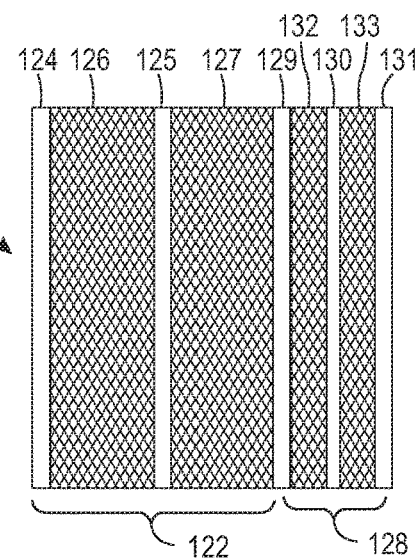
FIG. 1A  FIG. 1B
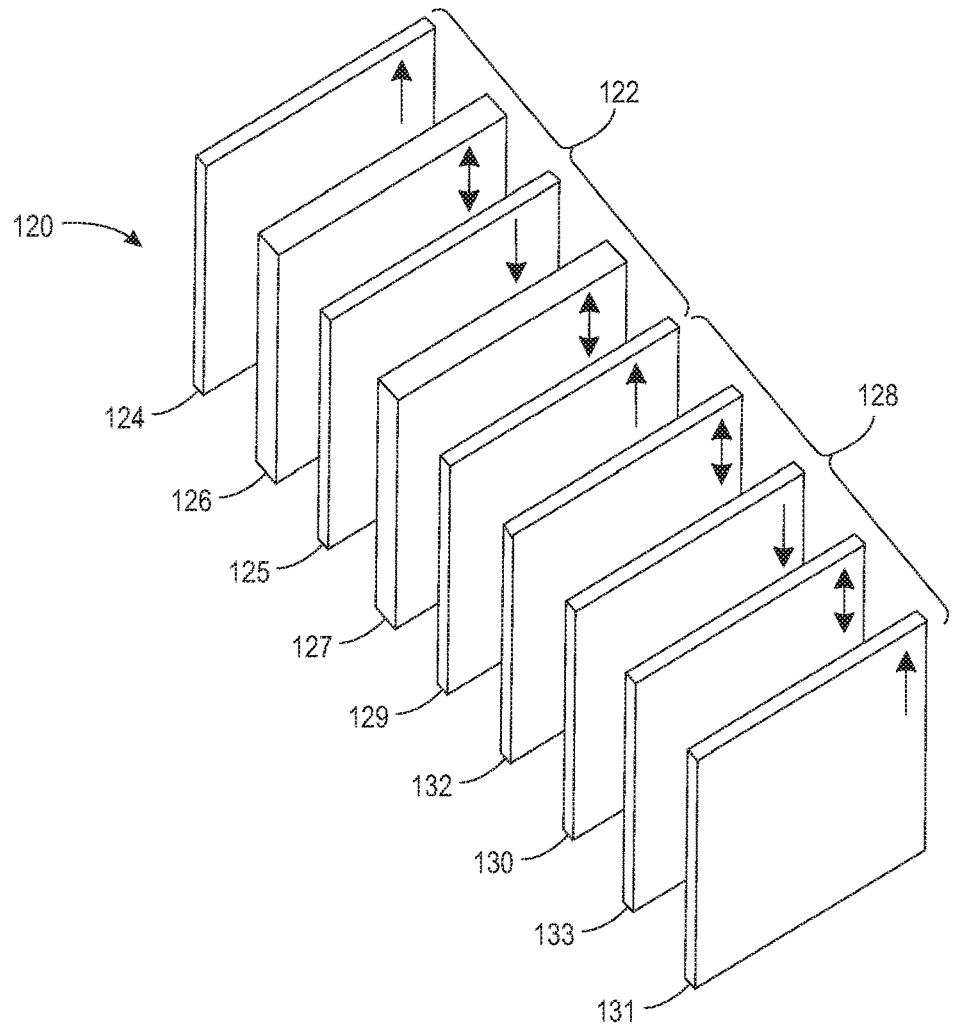
FIG. 1C

LIQUID-CRYSTAL VARIABLE RETARDER USING LIQUID CRYSTAL CELLS OF DIFFERING THICKNESSES

SUMMARY

The present disclosure is directed to a liquid-crystal variable retarder using LC layers of differing thicknesses. In one embodiment, a liquid-crystal variable retarder has first and second liquid-crystal cells with respective first and second thicknesses, the second thickness being less than the first thickness. A feedback sensor provides a feedback signal indicative of a retardance of the liquid-crystal variable retarder. A controller is coupled to the feedback sensor and the first and second liquid-crystal cells. The controller is operable to apply a first signal to the first liquid-crystal cell based on a target retardance trajectory and a feedforward control model. The controller applies a second signal to the second liquid-crystal cell based on the feedback signal and the target retardance trajectory.

In another embodiment, a liquid-crystal variable retarder has a first maximum retardance and a liquid-crystal waveplate has a second maximum retardance that is less than the first maximum retardance. The liquid-crystal waveplate is oriented relative to the liquid-crystal variable retarder such that the liquid-crystal waveplate, in a first state, has a minimal retardance that opposes a retardance of the liquid-crystal variable retarder. A controller coupled to the liquid-crystal waveplate is operable to switch the liquid-crystal waveplate from the first state to a second state. In the second state, the liquid-crystal waveplate has the second maximum retardance.

In another embodiment, a method involves receiving a temperature signal indicative of a temperature of a liquid-crystal variable retarder. The liquid-crystal variable retarder has a first liquid-crystal cell with a first thickness and has a second liquid-crystal cell with a second thickness that is less than the first thickness. A first signal is applied to the first liquid-crystal cell based on a target retardance input trajectory and an output of a feedforward control model of the liquid-crystal variable retarder. A parameter of the feedforward control model is modified based on the temperature signal. A retardance feedback signal is received from the liquid-crystal variable retarder, and a second signal applied to the second liquid-crystal cell is varied responsive to the retardance feedback signal.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

FIGS. 1A, 1B and 1C are diagrams of liquid-crystal variable retarders according to example embodiments;

DETAILED DESCRIPTION

Figure 2:
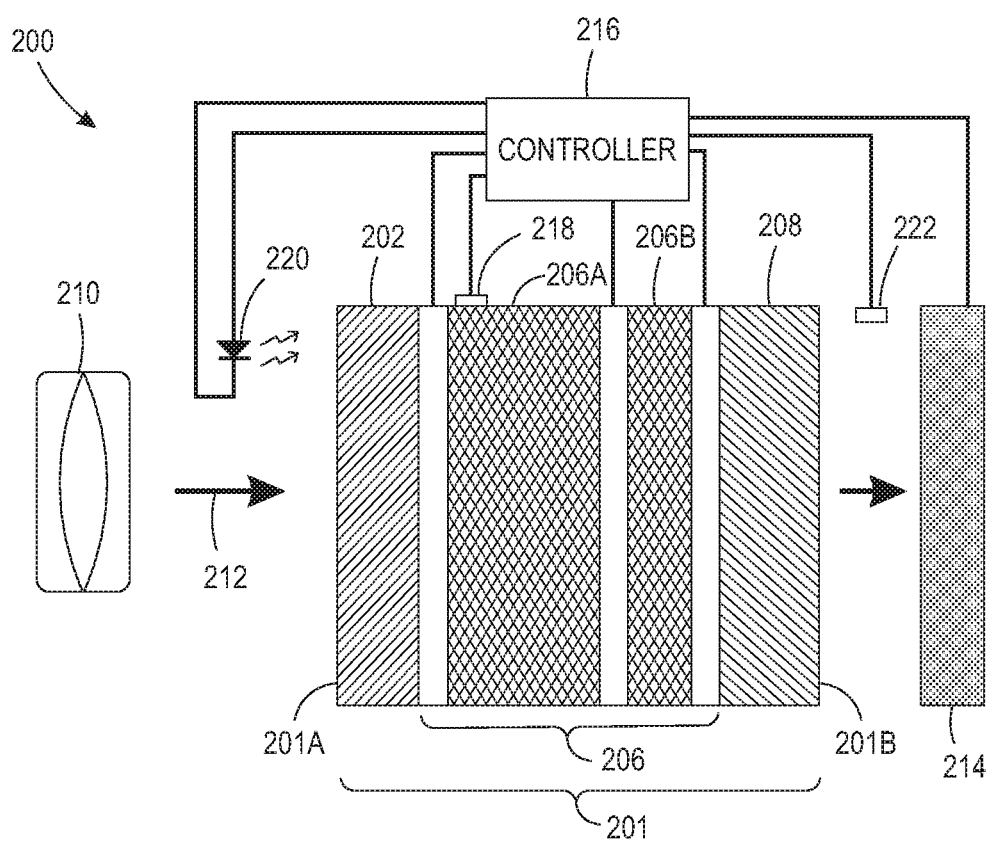
FIG. 2 is a block diagram of an apparatus according to an example embodiment.

The present disclosure relates to liquid-crystal devices used for optical sensing. Generally, liquid-crystal (LC) materials are liquids having some crystalline properties (e.g., orientation of internal structures, such as the LC director that indicates the local average alignment of LC molecules) that can be selectably altered by applying an external stimulus, such as an electric field or a magnetic field. A change in orientation of the LC director alters the optical properties of the LC materials, e.g., changing the optical axis of the LC birefringence. While the selectable orientation of liquid crystals has a wide range of applications (e.g., electronic displays) the present disclosure is directed to a class of devices known as variable optical retarders, or LC variable retarders (LCVRs).

An LCVR generates a variable optical path delay, or a variable retardance, between two orthogonal polarizations of light that travel through the liquid crystal. One or more liquid-crystal cells within the LCVR function as electrically tunable birefringent elements. By varying the voltage across the electrodes of the liquid-crystal cell, the cell molecules change their orientation, and it is possible to create a variable optical path delay between first rays in an incident polarization direction and second rays in an orthogonal polarization. This path delay causes a wavelength-dependent phase shift between the first and second rays.

Because LCVRs generate an electrically-controllable optical path delay, they are sometimes used within interferometers, specifically polarization interferometers. Polarization interferometers are common-path interferometers (meaning that both arms of the interferometer follow the same geometrical path) that combine polarizing elements with birefringent elements to generate interferograms, whereby the optical path delay induced by the birefringent elements varies spatially and/or temporally.

To create a polarization interferometer with an LCVR, the LCVR is placed between a first polarizer and a second polarizer with nominally parallel or perpendicular polarization axes. The slow axis of the LCVR (the polarization axis with the variable optical path delay) is oriented nominally 45 degrees with respect to the polarization direction of the first polarizer. Incoming light is polarized to an incident polarization direction by the first polarizer. Because the slow axis of the LCVR is at 45 degrees with respect to this incident polarization direction, the polarized incident light can be described in terms of a portion of light polarized parallel to the slow axis of the LCVR and a portion of light polarized perpendicular to this axis.

As the light passes through the LCVR, it acquires a wavelength-dependent relative phase shift between the first and second polarizations, thereby leading to a wavelength-dependent change in the polarization state. The second polarizer, or analyzer, oriented either parallel or perpendicular to the first polarizer, interferes the portion of light polarized parallel to the slow axis of the LCVR with the portion of light polarized perpendicular, changing the wavelength-dependent polarization state at the output of the LCVR into a wavelength-dependent intensity pattern that can be sensed by an optical detector or a focal plane array. By sensing this intensity while varying the retardance of the LCVR, it is possible to measure an interferogram of the incoming light, which can be used to ascertain spectral properties of the incoming light.

A polarization interferometer based on an LCVR may have a number of uses. For example, such a device may be used in hyperspectral imaging applications because of its abilities to encode spectral information of the incident light into an intensity pattern that is easily measured with a non-spectrally-resolving detector. Hyperspectral imaging refers to methods and devices for acquiring hyperspectral datasets or data-cubes, which may include images where densely sampled, finely resolved spectral information is provided at each pixel.

The wavelength-dependent intensity pattern provided by the polarization interferometer corresponds approximately to a cosine transform of the spectrum of the incident light. By recording the spatially-dependent intensity pattern at the output of a polarization interferometer as a function of the LCVR's retardance, the interferograms generated by all points of a scene imaged through the LCVR can be sampled simultaneously. From this, the hyperspectral data-cube can be nominally recovered by applying a transform, such as an inverse cosine transform or Fourier transform along the retardance axis, to the recorded spatially-dependent interferogram.

To accurately calculate the hyperspectral data-cube, the processing apparatus used to apply the above transform should have precise knowledge of the retardance state of the LCVR over its clear aperture for each individual interferogram sample. In addition, to most accurately calculate the hyperspectral data-cube it is desired to measure retardances at and/or above and/or below zero retardance.

Uncompensated LCVRs typically have some residual retardance, even in their lowest-retardance state. That is, the LCVR can scan from a minimal retardance to a maximal retardance without ever reaching a state of zero retardance or passing through a state of zero retardance. While some LCVRs may be compensated by the addition of waveplates with slow axes aligned perpendicular to the slow axes of the LCVR, the retardance compensation of these waveplates may vary as a function of temperature and/or wavelength, and thus they are not ideally suited for hyperspectral imaging applications. In embodiments described herein, an LVCR includes features that allow precise control of the retardance and also enable accessing retardances above, at, and below zero retardance.

In FIG. 1A, a block diagram shows an LCVR 100 according to an example embodiment. The LCVR 100 includes a first LC cell 102 with a substrate 104 and LC layer 106. The substrate 104 has electrodes and alignment layers to control the LC layer 106. The LCVR 100 includes a second LC cell 108 with an LC layer 110 disposed between substrates 112 and 114 that include adjacent electrodes and alignment layers. Note that substrate 112 may be considered part of both cells 102, 108, e.g., having electrodes and alignment layers that control both layers 106, 110. One or both LC cells 102, 108 may include a pi-cell and/or optically-compensated bend (OCB) cell to increase the viewing angle. Note that, for reasons that will be discussed in detail below, the LC cell 102 is substantially thicker than the LC cell 108.

In some embodiments, an LCVR may utilize double-nematic LC cells, as shown in the diagrams of FIGS. 1B and 1C. An LCVR 120 includes first LC cell 122 with substrates 124, 125 and LC layers 126, 127. The substrates 124, 125 have electrodes and alignment layers to control LC layers 126, 127. The LCVR 120 includes a second LC cell 128 with substrates 129-131 and LC layers 132, 133. Substrates 125, 129, and 130 may have electrodes and alignment layers that separately control respectively adjacent LC layers. As with the example shown in FIG. 1A, the first cell 122 is thicker (thus has a greater maximum retardance) than the second cell 128.

Cells 122 and 128 are double-nematic LC cells, which are LC cells with two sub-cells having an LC alignment mirrored about the middle substrate(s) of the stacked sub-cells. As shown in FIG. 1C, the LC cell's rubbing direction is indicated by an arrow on each substrate 124, 125, 129-131 and is the preferred direction along which the molecules of the liquid-crystal layer on either side of each substrate orient. Thus, light polarized in the direction of the arrows on each substrate 124, 125, 129-131 (extraordinary ray or e-ray) will be retarded with respect to light polarized orthogonally (ordinary ray or o-ray). Thus for LC cells 122, 128, the first-order angular dependence of retardance of layers 126 and 132 is respectively negated by the first-order angular dependence of retardance of layers 127 and 133.

As noted above, an LCVR may be used in a polarization interferometer that is used for applications such as hyperspectral imaging. An example of a hyperspectral imaging device 200 is shown in the block diagram of FIG. 2. The device 200 includes a polarization interferometer 201 with a first polarizer 202 that polarizes incoming light 212 in an incident polarization direction, nominally 45 degrees to the slow axis of LCVR 206. The LCVR 206 may be configured according to any of the embodiments described in relation to FIGS. 1A-IC, and includes at least a first, thick LC cell 206a and a second, thin LC cell 206b. Note that the cells 206a-b may be arranged in any order, e.g., the thin cell 206b may be placed to the left relative to the thick cell 206a.

The liquid-crystal cells within the LCVR 206 function as electrically tunable birefringent elements. By varying the voltage across the LC cells 206a-b, the liquid-crystal molecules change their orientation. This change in orientation makes it possible to create a variable optical path delay between an e-ray and an o-ray of the incident light 212. This path delay causes a wavelength-dependent phase shift between the two rays, thereby leading to a wavelength-dependent change in the overall polarization state.

A second polarizer 208, or analyzer, oriented either parallel or perpendicular to the first polarizer 202, changes this wavelength-dependent polarization state into a wavelength-dependent intensity pattern by interfering the e-ray and the o-ray. The intensity pattern (as a function of path delay) is equivalent to an interferogram generated by, for example, a Michelson interferometer. Thus, the intensity pattern corresponds to the cosine transform of the spectrum of the incident light as a function of path delay.

The hyperspectral imaging device may include a lens 210 to focus incoming light 212 to an input side 201a of the polarization interferometer 201, an image sensor 214 (e.g., focal plane array) to receive the intensity pattern emanating from an output end 201b of the polarization interferometer 201, and a controller 216. The controller 216 may include digital and analog circuitry that can vary the orientation of the LC molecules within the first and second LC cells 206a-b by varying the voltage applied across the cell's electrodes. Note that if the LCVR 206 uses double-nematic cells as shown in FIGS. 1B-C, then additional voltages may be applied to the electrodes between sub-cells, and the controller 216 may therefore use more signal lines than shown in FIG. 2.

By recording a series of images via the image sensor 214 as the voltages on the LVCR 206 are changed by the controller 216, the interferograms at all points in an image can be sampled simultaneously, and a hyperspectral data-cube can be recovered by inverse cosine transform, with respect to optical path delay, of the spatially-varying interferogram. Further details of a hyperspectral imaging device using an LVCR can be found in U.S. Patent Application 2016/0123811.

The LCVR used in hyperspectral imaging has a relatively thick LC layer in order to achieve a high retardance and therefore a narrow spectral resolution. Where two or more LC layers are used within a given LC cell (e.g., a double-nematic LC cell), the LC layers may also be equal in thickness to simplify the control scheme, e.g., so the layers can be driven with the same waveform. The large thicknesses of these cells means they have a long time constant, so some form of feedforward control may be used to control the overall state of the LCVR and to compensate for conditions that affect the properties of the LCVR when feedback control alone would be too slow. For example, the retardance of the LCVR is dependent on temperature, so a temperature sensor 218 thermally coupled to the LCVR 206 may be used to calculate a compensation value for voltages applied to the LVCR via the controller 216 in order to achieve a specific retardance state. However, due to deviations of the feedforward control output from the ideal control output that would generate a desired retardance trajectory as a function of time when applied to the LCVR 206, there may be a deviation from this desired retardance trajectory, referred to as a retardance error.

Two kinds of control known in the art of control theory are feedforward control and feedback control. Feedforward control uses knowledge of a system and its dynamics in order to affect a certain output trajectory. It is typically used in applications that have a long time constant associated with the dynamics, such as when a known thermal disturbance is introduced into a temperature-controlled system with a large thermal mass. The time constants in such a situation may be too long for feedback control alone to be effective. Feedback control measures the deviation/error of a system output trajectory from a desired trajectory and applies negative feedback to the system input to correct for the deviation. Feedback control works well when the time constant of the control loop is short relative to timescales of interest.

For the thick LC cell layers used in high-retardance LCVRs for various applications, feedback control can be less effective because the control loop time constant may be too long relative to timescales of interest for the various applications. To shorten the time constant, one could decrease liquid-crystal layer thicknesses, but this would decrease the overall retardance stroke of the LCVR. Therefore, more LC layers would need to be added to achieve the same retardance, adding to system complexity. Embodiments described herein can overcome these limitations by separating the LCVR into one or more layers that are controlled by feedforward control only and one or more other layers that are controlled primarily by feedback control.

An example of this is shown in FIG. 2, where the first LC layer 206a is relatively thick compared to the second LC layer 206b. The thicker cell 206a is controlled by feedforward control and the thinner cell 206b is controlled by feedback control. The feedback-controlled cell 206b can be used to rapidly correct for errors in the overall retardance that could not be corrected for quickly enough by applying feedback control to the thicker, feedforward cell 206a alone. It is generally the case that retardance errors, or deviations from desired retardance trajectories, are small relative to the overall retardance stroke of the LCVR, and therefore the thinner cell 206b just needs to be thick enough to accommodate for these errors while still being able to react quickly to short-time-constant fluctuations of the retardance error.

For example, a typical LC layer thickness for a single layer LC cell used for hyperspectral imaging applications might be 50 microns. As the LC cell response time scales as the thickness squared, a thinner cell of 5 microns thickness would have a response time 100× smaller (i.e., $\frac{1}{100}^{th}$) than that of the thicker cell, yet would be able to compensate up to a nominal 10% retardance error. Because of the much shorter response time of the thinner cell 206b, it could be used to correct the retardance trajectory at a rate much faster than the retardance errors arise. This is because the retardance errors only arise at a rate limited by the response time of the thicker cell 206a and in response to miscalculation of the ideal feedforward signal. For a practical application, the thicker cell may be at least five times thicker than the thinner cell, such that the thinner cell has a response time at least 25 times that of the thicker cell.

In order to provide a retardance feedback signal, a monochromatic light source (e.g., laser diode 220) can be used to illuminate a portion of the image sensor 214 (e.g., one or more pixels) and/or another optical sensor 222 such as a photodiode via the polarization interferometer 201. The image sensor 214 and/or optical sensor 222 provide an electrical output that varies based on detected intensity of the light emanating from an output end 201b of the polarization interferometer 201. The controller 216 then calculates the overall retardance state of the LCVR 206 based on the current and previous detected intensities of light that has passed through the polarization interferometer 201. The controller 216 uses this information about the LCVR state as feedback to calculate the next voltage to apply to one of the cells, for example the thinner LC cell 206b, within the LCVR 206. It can also use the information to update its control algorithms for the feedforward controller to provide a more accurate model for the LCVR 206a the next time its retardance is commanded to follow a certain trajectory. In this way, deviations from the ideal voltage waveforms for causing a certain retardance trajectory are iteratively corrected for, while the voltage waveforms converge to their ideal values and there is less reliance on the feedback controller to correct for instantaneous retardance errors.

Figure 3:
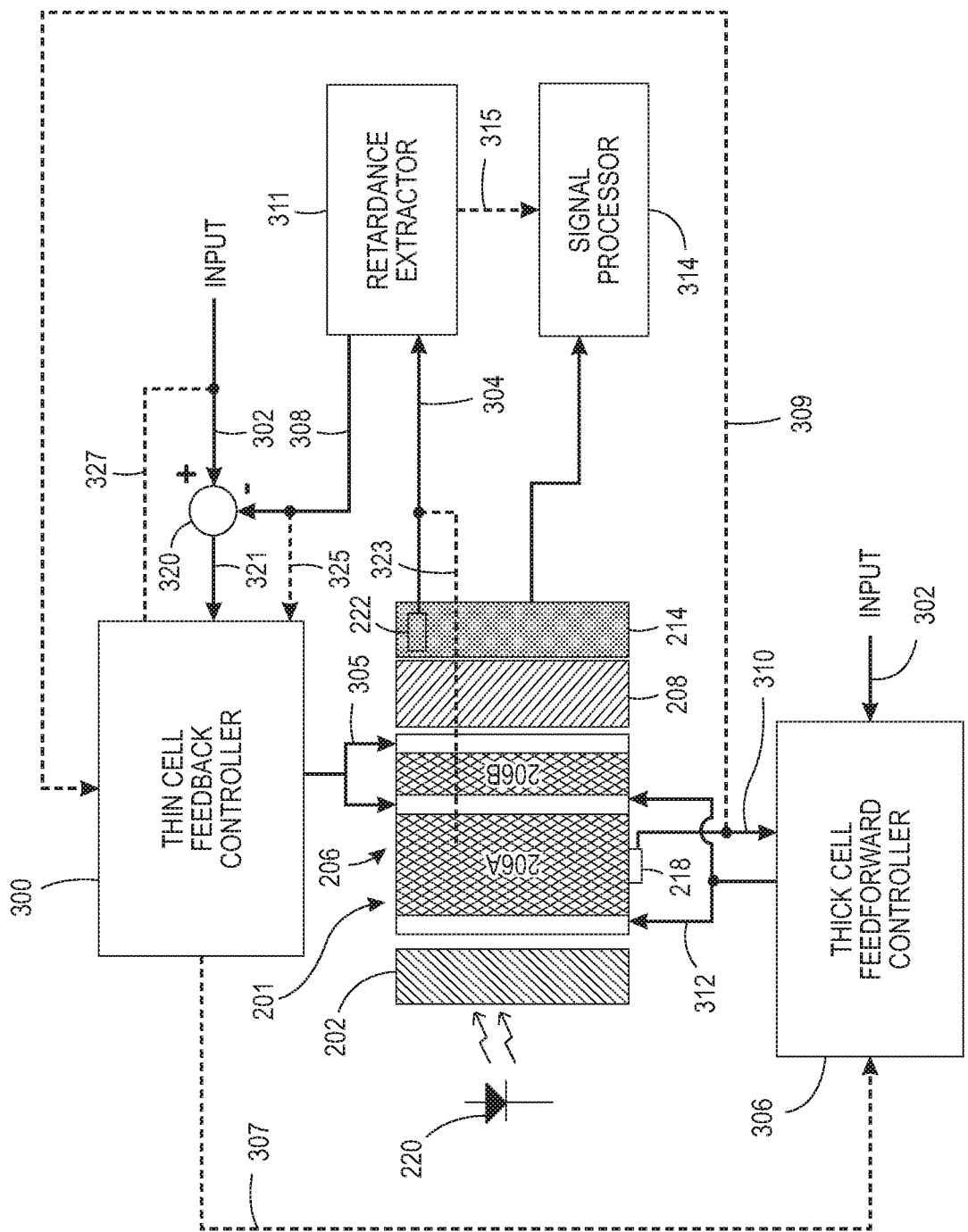
FIG. 3 is a block diagram of a retardance control arrangement according to an example embodiment.

In FIG. 3, a control diagram shows a feedback and feedforward arrangement according to an example embodiment. A feedback controller 300 applies an output signal 305 to electrodes surrounding the second, relatively thinner, LC layer 206b. The feedback controller 300 utilizes an input 302, e.g., a desired retardance trajectory as a function of time, or a particular retardance at a particular time of the desired retardance trajectory. Note that input 302 could represent an instantaneous retardance at one location in FIG. 3, such as the input to the feedback controller 300, and a retardance trajectory at another location of FIG. 3, such as the input to the feedforward controller 306. A feedback signal 304 is obtained from the image sensor 214 or photodetector 222, e.g., based on a response of the polarization interferometer 201 to being illuminated by laser diode 220 or other light source (e.g., light emitting diode). Typically, this feedback signal 304 is an interferogram of a monochromatic source of known wavelength.

The feedback signal 304 is processed via retardance extractor 311 to obtain a retardance signal 308. A retardance error signal 321 is obtained by summation block 320 and is used by the controller 300 to adjust the output signal 305 applied to the LC layer 206b. Note that the feedback signal 304 could instead or in addition be derived from capacitance measurements of the LC layers 206a, 206b, as indicated by path 323. Also, as indicated by paths 325 and 327, the retardance signal 308 and/or the input 302 could be sent directly to the feedback controller 300. There may be more complex operations in the controller 300 that would rely on both of these signals.

The feedforward controller 306 applies an output signal 312 to electrodes surrounding at least the second, relatively thicker, LC layer 206a. The feedforward controller 306 utilizes the input 302 to adjust the output signal 312 to control the retardance of the LCVR 206 as a function of time, the output signal 312 being adjusted based on a feedforward dynamical control model of the LC layer 206a, e.g., one that adjusts the output signal 312 to accommodate for different temperatures and/or retardance scan times. As noted above, a parameter that defines an operating point of the feedforward controller 306 can be adjusted, e.g., if the mean absolute value of the retardance error signal 321 is above a given threshold. The feedforward controller 306 may obtain and process the retardance signal 308 directly from the retardance extractor 311 or may receive the error signal 321 or some other metric derived from the error signal 321 via feedback controller 300, as indicated by path 307. The output signal 312 of the feedforward controller 306 may be varied at least based on signal 310 received from temperature sensor 218. The output signal of the feedback controller 300 may also depend on the sensed temperature, as indicated by path 309.

Together, the feedback and feedforward controllers 300, 306 improve accuracy of the interferograms measured by the imaging sensor 214. The interferograms are processed by a signal processor 314 that obtains the hyperspectral imaging data or hyperspectral data-cube. In some cases, the signal processor 314 may use information about the retardance trajectory for a given interferogram when calculating hyperspectral imaging data from that interferogram. For example, the interferogram samples may be interpolated in uniform retardance steps before applying a Fourier transformation to the interferogram to calculate the hyperspectral data-cube. This is indicated by path 315 which communicates retardance information from the retardance extractor 311 to the signal processor 314. Note that the controllers 300, 306 and other processing blocks 311, 314 may be implemented on one or more controller devices, such as a system-on-a-chip, application specific integrated circuit, etc., and as such may be collectively referred to as a controller and/or controller device.

Figure 4A:
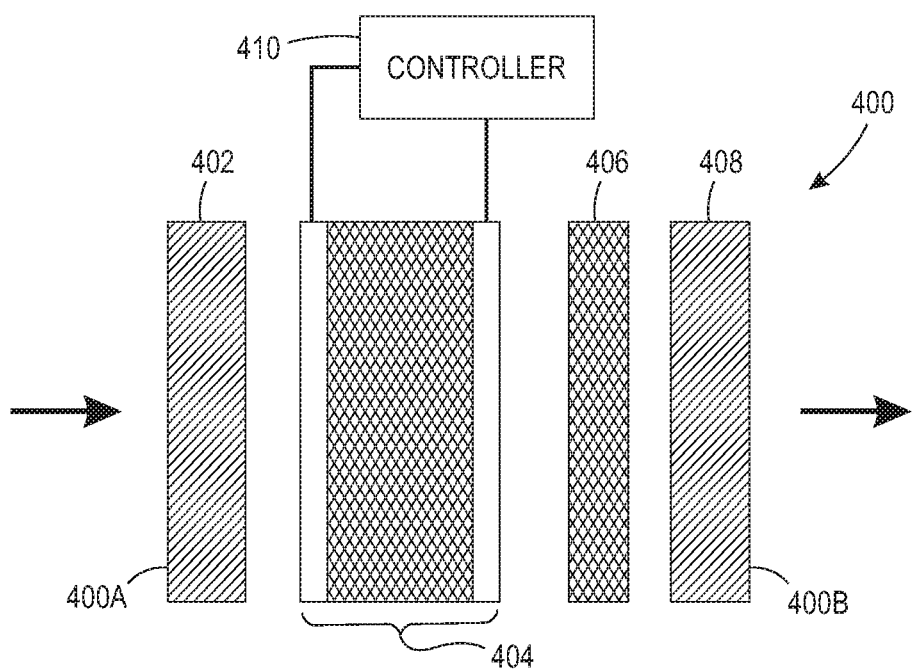
FIGS. 4A and 4B are block diagrams of apparatuses according to other example embodiments.

As noted above, an LCVR typically has some residual retardance in its lowest-retardance state, which, when used within a polarization interferometer, can prevent the measurement of interferograms at and near zero path delay or interferograms that span both positive and negative path delays. This is undesirable as much of the interferogram signal is present at and near zero path delay. The residual retardance of the LCVR in its lowest retardance state can be addressed via the addition of a fixed waveplate (with slow axis 90° with respect to the LCVR slow axis), that can bring the LCVR to a zero path delay (or even negative path delay) state. This is seen in FIG. 4A, which is a block diagram of a polarization interferometer 400 according to an example embodiment.

The polarization interferometer 400 includes a first polarizer 402, an LC cell 404, an LC waveplate 406, and a second polarizer 408. The components shown in FIG. 4 may be configured analogously to like-named components described above, e.g., the LCVR 404 in some embodiments may include one or more double-nematic cells and/or a combination of thin/thick cells. A controller 410 applies signals to the LCVR 404 to vary retardance as described hereinabove. The waveplate 406 is provided to correct for residual retardance in the LC cell 404.

Note that liquid-crystal has different dispersion characteristics than common waveplate materials. Also, liquid-crystal dispersion can vary significantly with changes in temperature. Therefore, if the waveplate 406 were fabricated from a common waveplate material such as calcite or quartz, each wavelength would attain zero path delay at slightly different states of the LCVR 404, in a manner that varies with temperature. This would introduce phase errors in interferograms obtained with the LCVR 404, which can cause artifacts in hyperspectral images calculated from those interferograms. The illustrated waveplate 406 overcomes this by being made out of the same liquid-crystal material used in the LCVR 404. That way, both the waveplate 406 and the rest of the LCVR 404 have the same dispersion characteristics and thus all wavelengths would attain zero path delay at the same state of the LCVR 404 across a wide temperature range.

Figure 4B:
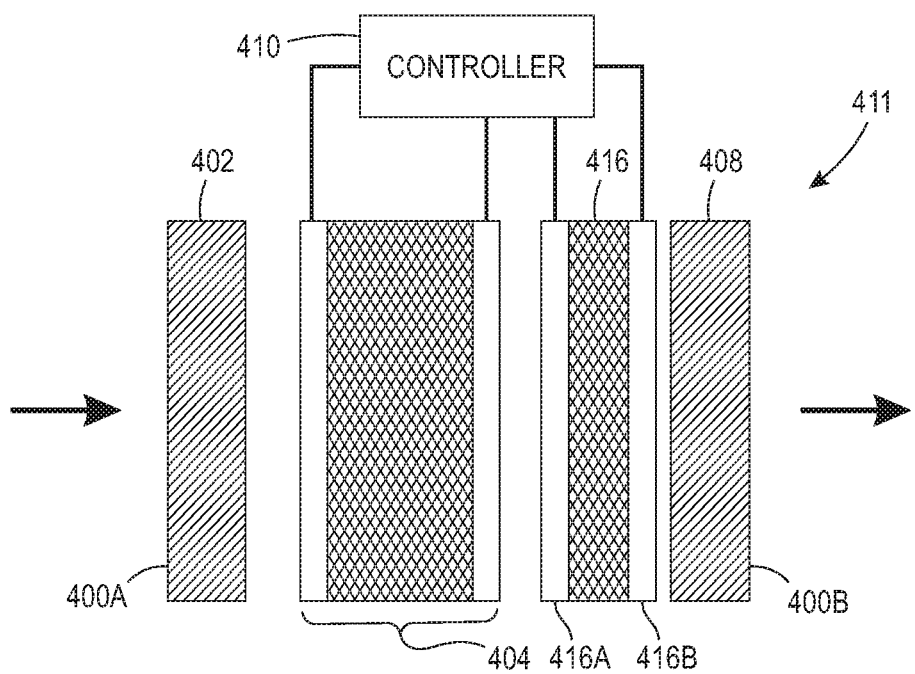

The LC waveplate 406 will generally be quite thin as compared to the combined LC layer thicknesses of the LCVR 404 itself as it is generally intended to compensate a small fraction of the maximum retardance of the LCVR 404. As such, the LC waveplate 406 generally has a maximum retardance that is less than a maximum retardance of the LCVR 404. As shown in FIG. 4A, the liquid-crystal waveplate 406 is fixed, e.g., not driven by the controller 410. In other embodiments, a liquid-crystal waveplate may be actively driven between two states. This is shown in FIG. 4B, which shows a polarization interferometer 411 according to another example embodiment, wherein components in FIG. 4A use the same reference numbers as similar/same components described in relation to FIG. 4A.

The polarization interferometer 411 includes an LC waveplate 416 that includes electrodes 416a-b driven between two states by the controller 410. For example, in one state the LC waveplate 416 has a minimal retardance because the liquid-crystal director may be driven perpendicular to the electrodes. In the other state, the LC waveplate 416 has a maximum retardance because the liquid-crystal director may be driven parallel to the electrodes. The preceding assumes positive birefringence; the opposite would hold for negative birefringence.

When used for hyperspectral imaging, selecting between the first and second states can cause the detected interferometer signals to be nominally symmetric or nominally one-sided (clipped or otherwise non-symmetric) about zero path delay or zero retardance. The nominally one-sided interferograms achieve the highest absolute path delay and thus the highest spectral resolution. However, if phase errors are present, they may introduce artifacts in the calculated hyperspectral image data; in this case, it is desirable to measure enough of the full double-sided, symmetric interferogram to recover phase information. The two interferograms, one measured for each state of this waveplate, can also be combined into an interferogram nominally measured from a negative path delay −L to a positive path delay +2L. Therefore, the benefits of phase correction and high spectral resolution could be simultaneously realized.

Figure 5:
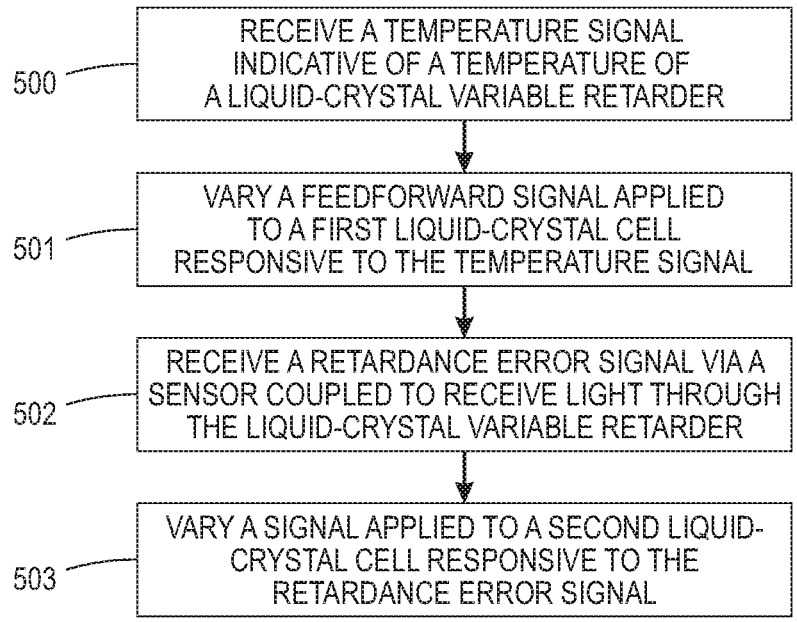
FIGS. 5 and 6 are flowcharts of methods according to example embodiments.

In FIG. 5, a flowchart shows a method according to an example embodiment. The method involves receiving 500 a temperature signal indicative of a temperature of an LCVR. The LCVR includes a first LC cell and a second LC cell, the first LC cell being thicker than the second LC cell. A feedforward signal applied to the first LC cell is varied 501 responsive to the temperature signal. A retardance error signal is received 502 via a sensor coupled to receive light through the LCVR. Responsive to the retardance error signal, a signal applied to the second liquid-crystal cell is varied 503.

Figure 6:
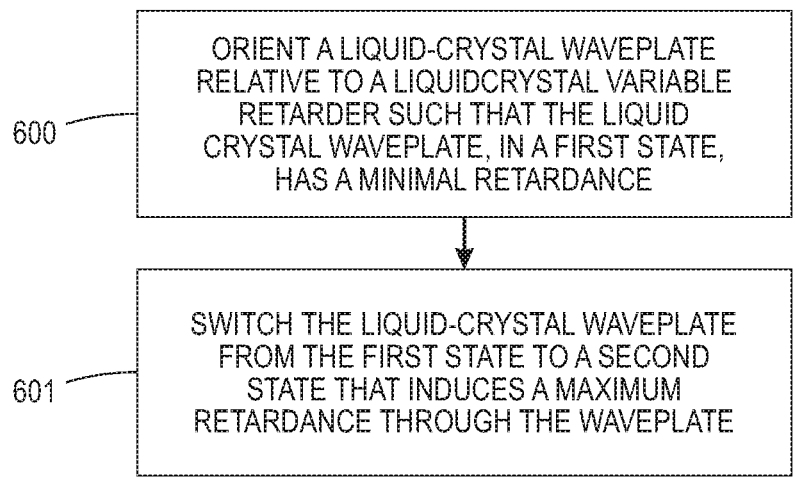

In FIG. 6, a flowchart shows a method according to another example embodiment. An LC waveplate is oriented 600 relative to an LCVR such that the liquid-crystal waveplate, in a first state, has a minimal retardance. This can, when used in a polarization interferometer, cause the interferometer output to be nominally one-sided about zero path delay, (a single-sided interferogram). The liquid-crystal waveplate is switched 601 from the first state to a second state that induces a maximum retardance. The maximum retardance results in a maximum path delay that, when used in a polarization interferometer, causes the interferometer output to be nominally symmetrical about zero path delay.

In other embodiments, the minimal retardance of the first state can be used to compensate for the residual retardance of the LCVR. Or, if the first state is used to cause a nominally one-sided interferogram, the residual retardance of the LCVR could be compensated by yet another waveplate or LC layer, such as a passive or fixed waveplate as shown in FIG. 4A.

Figure 7:
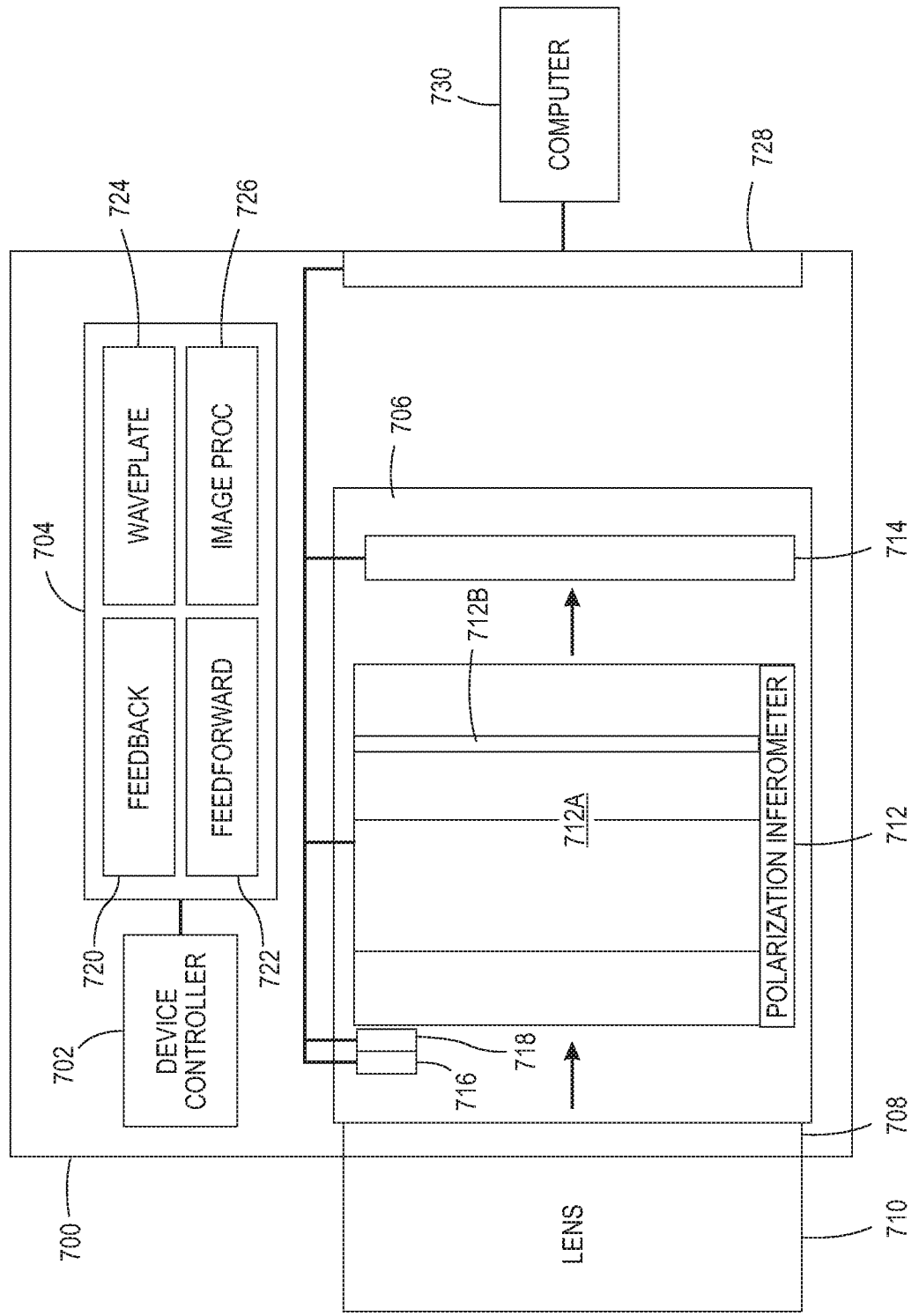
FIG. 7 is a block diagram of an apparatus according to another example embodiment.

In FIG. 7, a block diagram illustrates an apparatus 700 according to an example embodiment. The apparatus 700 includes a device controller 702, which may include one or more processors, such as central processing units, subprocessors, digital signal processors, etc. The controller 702 is coupled to a memory 704 that includes functional modules that will be described in greater detail below. The memory 704 may include a combination of volatile and non-volatile memory, and may store instructions and data as known in the art.

The apparatus includes an optical section 706 that includes an external interface 708 that receives light from outside the apparatus 700. The external interface 708 may include windows, lenses, filters, etc., suitable for passing light from outside the apparatus 700 to internal optical components. In this example, the interface 708 is configured to be coupled to an external lens 710.

A polarization interferometer 712 is located in the optical section 706 of the apparatus 700. The polarization interferometer 712 is coupled to the controller 702, e.g., via electrical signal lines. The controller 702 applies signals to the polarization interferometer 712 to cause a time-varying optical path delay or retardance in an LCVR 712a that is part of the interferometer 712. This time-varying optical path delay creates an interferogram that varies as a function of the optical path delay. The interferogram is detected by an image sensor 714 (e.g., an array of sensor pixels or focal plane array) which is also coupled to the controller 702. The polarization interferometer 712 and LCVR 712a may be configured similar to previously described embodiments.

A feedback sensor 716 and feedforward sensor 718 may be integrated with or attached to the LCVR 712a. Generally, the feedforward sensor 718 senses a state (e.g., temperature) of the LC cells within the LCVR 712a that may be incorporated into a feedforward control model. A feedback control module 720 uses signals produced via the feedback sensor 716 to control at least one LC cell of the LCVR 712a (e.g., a relatively thin LC cell). In one embodiment, the feedback sensor 716 is a monochromatic light source on one side of the interferometer 712 and a photodetector on the other side of the interferometer 712, combined with signal processing to extract the retardance from the photodetector signal. As noted above, the image sensor 714 may be used as part of the feedback sensor 716. In other embodiments, the feedback sensor 716 could include circuitry that measures the capacitance of one or more of the LC cells within the interferometer 712. This capacitance signal can be converted to a retardance signal through a look-up table or other means.

A feedforward control module 722 uses signals (e.g., temperature signals) produced via the feedforward sensor 718 as input to a feedforward control model used to control at least one other LC cell of the LCVR 712a (e.g., a relatively thick LC cell). The temperature adjusts an operating point of the feedforward control model, and an output of the model is used to modify a control input applied to one or more LC cells of the LCVR 712a. The control model used by the feedforward control module 722 may further be adjusted based on retardance errors detected by the feedback module 720. For example, the output of the feedforward control model could be further adjusted to compensate for systematic deviations of a retardance trajectory of the LCVR 712a from a desired retardance trajectory. In this way, the feedback control module 720 is primarily using the thinner LC cell to compensate for short-time-scale, random (not systematic) deviations of retardance from a desired retardance trajectory.

In some embodiments, the polarization interferometer 712 may include an LC waveplate 712b that compensates for residual retardance of LC layers in the LCVR 712a. In such a case, the LC waveplate 712b may be fixed or non-driven. In other embodiments, the LC waveplate 712b may be driven by waveplate control module 724, which switches the LC waveplate 712b between first and second states having respective minimum and maximum retardance. These states may be discrete, e.g., no intermediate states, although the signals used to toggle between the discrete states may be varied based on local conditions, e.g., via feedback or feedforward adjustment.

The apparatus 700 may be configured as a hyperspectral imager, where the relative path delay of portions of light passing through the polarization interferometer 712 is modified over a period of time. This path delay results in time- and position-dependent interferograms that are sensed at each pixel of the image sensor 714. The interferograms can be processed by performing an inverse cosine transform or Fourier transform of the recorded signal as a function of path delay, resulting in a hyperspectral data-cube. This processing may be performed by an image processing module 726. Some or all of the processing may be performed by an external device, such as computer 730 that is coupled to the apparatus 700 via a data transfer interface 728.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a liquid-crystal variable retarder comprising:
      a first liquid-crystal cell having a first thickness; and
      a second liquid-crystal cell having a second thickness that is less than the first thickness;
   a feedback sensor providing a feedback signal indicative of a retardance of the liquid-crystal variable retarder; and
   a controller coupled to the feedback sensor and the first and second liquid-crystal cells, the controller operable to:
      apply a first signal to the first liquid-crystal cell based on a target retardance trajectory and a feedforward control model; and
      apply a second signal to the second liquid-crystal cell based on the feedback signal and the target retardance trajectory.

2. The apparatus of claim 1, further comprising a temperature sensor thermally coupled to the liquid-crystal variable retarder, a temperature signal from the temperature sensor being input to change a parameter of the feedforward control model.

3. The apparatus of claim 1, wherein the feedback signal is used to further adjust a parameter of the feedforward control model.

4. The apparatus of claim 1, further comprising first and second polarizers at a respective input side and output side of the liquid-crystal variable retarder, the first and second polarizers oriented with polarization axes at a nominal 45 degree angle to an alignment direction of the first and second liquid-crystal cells, the first and second polarizers being either perpendicular or parallel to each other.

5. The apparatus of claim 4, wherein the feedback sensor comprises a photodetector and a monochromatic light source that illuminates the photodetector through the first and second polarizers and the liquid-crystal variable retarder, the photodetector producing an electrical output in response thereto.

6. The apparatus of claim 5, wherein the controller is further operable to convert the electrical output to the feedback signal indicative of the retardance of the liquid-crystal variable retarder.

7. The apparatus of claim 4, wherein the first and second signals cause a time-varying optical path delay of the liquid-crystal variable retarder to create an interferogram that varies as a function of the optical path delay.

8. The apparatus of claim 4, further comprising:
   an image sensor coupled to record a spatially-dependent intensity pattern of light emitted from the second polarizer; and
   wherein the controller is coupled to the image sensor and configured to:
      vary a retardance of the liquid-crystal variable retarder and
      synchronize the image sensor's recording of the spatially-dependent intensity pattern of light with the variation in retardance of the liquid-crystal variable retarder.

9. The apparatus of claim 1, further comprising a liquid-crystal waveplate, the liquid-crystal waveplate correcting for residual retardance in at least one of the first and second liquid-crystal cells.

10. The apparatus of claim 1, further comprising a liquid-crystal waveplate coupled to the controller, the controller operable to switch the liquid-crystal waveplate between a first state having minimal retardance and a second state having a maximum retardance.

11. The apparatus of claim 1, wherein the feedback sensor comprises a circuit that detects a capacitance of at least the first liquid-crystal cell.

12. The apparatus of claim 1, wherein at least one of the first and second liquid-crystal cells comprises a double-nematic cell.

13. The apparatus of claim 1, wherein at least one of the first and second liquid-crystal cells comprises a pi-cell or an optically-compensated bend cell.

14. The apparatus of claim 1, wherein the first liquid-crystal cell has a response time at least 25 times that of the second liquid-crystal cell.

15. An apparatus comprising:
   a liquid-crystal variable retarder having a first maximum retardance;
   a liquid-crystal waveplate having a second maximum retardance that is less than the first maximum retardance, the liquid-crystal waveplate oriented relative to the liquid-crystal variable retarder such that the liquid-crystal waveplate, in a first state, has a minimal retardance that opposes a retardance of the liquid-crystal variable retarder,
   a controller coupled to the liquid-crystal waveplate, the controller operable to switch the liquid-crystal waveplate from the first state to a second state, wherein the liquid-crystal waveplate, in the second state, has the second maximum retardance; and
   first and second polarizers at a respective input side and output side of the liquid-crystal variable retarder, wherein the first and second polarizers, the liquid-crystal variable retarder, and the liquid-crystal waveplate form a polarization interferometer, wherein the first and second states of the liquid-crystal waveplate cause an output of the polarization interferometer to be respectively nominally one-sided about a zero optical path delay or nominally symmetric about the zero optical path delay.

16. The apparatus of claim 15, wherein the liquid-crystal variable retarder comprises a first liquid-crystal cell having a first thickness and a second liquid-crystal cell having a second thickness that is less than the first thickness, wherein a feedback signal is used to adjust an input applied to the second liquid-crystal cell in a manner that minimizes a retardance error of the liquid-crystal variable retarder.

17. The apparatus of claim 16, wherein a feedforward model is used to adjust a control input applied to the first liquid-crystal cell.

18. A method, comprising:
receiving a temperature signal indicative of a temperature of a liquid-crystal variable retarder, the liquid-crystal variable retarder comprising a first liquid-crystal cell having a first thickness and a second liquid-crystal cell having a second thickness that is less than the first thickness;
applying a first signal to the first liquid-crystal cell based on a target retardance trajectory and an output of a feedforward control model of the liquid-crystal variable retarder, a parameter of the feedforward control model being modified based on the temperature signal;
receiving a retardance feedback signal from the liquid-crystal variable retarder; and
varying a second signal applied to the second liquid-crystal cell responsive to the retardance feedback signal.

19. The method of claim 18, further comprising:
determining an electrical output of an optical sensor responsive to a monochromatic light transmitted through the liquid-crystal variable retarder to the optical sensor; and
determining the retardance feedback signal based on the electrical output.

20. The method of claim 18, further comprising:
determining a capacitance of at least one of the first and second liquid-crystal cells; and
determining the retardance feedback signal based on the capacitance.

* * * * *